US007744689B2

United States Patent
Hojaji et al.

(10) Patent No.: US 7,744,689 B2
(45) Date of Patent: Jun. 29, 2010

(54) ALKALI RESISTANT GLASS COMPOSITIONS

(75) Inventors: Hamid Hojaji, Claremont, CA (US); David Leslie Melmeth, Upland, CA (US)

(73) Assignee: James Hardie Technology Limited, Dublin (IE)

( * ) Notice: Subject to any disclaimer, the term of this patent is extended or adjusted under 35 U.S.C. 154(b) by 1115 days.

(21) Appl. No.: 11/361,694

(22) Filed: Feb. 24, 2006

(65) Prior Publication Data

US 2006/0240967 A1    Oct. 26, 2006

Related U.S. Application Data

(60) Provisional application No. 60/656,579, filed on Feb. 24, 2005.

(51) Int. Cl.
C04B 35/16    (2006.01)

(52) U.S. Cl. .................. 106/605; 106/600; 501/33; 501/53; 501/68

(58) Field of Classification Search .................. 501/33, 501/53, 68; 106/600, 605
See application file for complete search history.

(56) References Cited

U.S. PATENT DOCUMENTS

| | | | |
|---|---|---|---|
| 1,819,093 A | 8/1931 | Hardinge | |
| 2,619,776 A | 12/1952 | Potters | |
| 2,676,892 A | 4/1954 | McLaughlin | |
| 2,746,735 A | 5/1956 | Bradford | |
| 2,762,619 A | 9/1956 | Booth | |
| 2,782,018 A | 2/1957 | Bradford | |
| 2,797,201 A | 6/1957 | Veatch | |
| 2,838,881 A | 6/1958 | Plumat | |
| 2,945,326 A | 7/1960 | Wood | |
| 2,947,115 A | 8/1960 | Wood | |
| 2,978,339 A | 4/1961 | Veatch et al. | |
| 2,978,340 A | 4/1961 | Veatch et al. | |
| 3,010,177 A | 11/1961 | Thompson et al. | |
| 3,081,179 A | 3/1963 | Charvat et al. | |

(Continued)

FOREIGN PATENT DOCUMENTS

CA    1040859    10/1978

(Continued)

OTHER PUBLICATIONS

JP 09067174 (Mar. 11, 1997) Minagawa et al. abstract only.*

(Continued)

*Primary Examiner*—Paul Marcantoni
(74) *Attorney, Agent, or Firm*—Gardere Wynne Sewell LLP

(57) ABSTRACT

An alkali resistant glass composition having improved durability to withstand highly alkali environments at elevated temperatures, such as curing of cementitious products in an autoclave, is conveniently formed from economical and abundant materials. The glass composition includes increased levels of calcium and iron, and relatively low levels of alkali metals, as compared to many other alkali resistant glass products, and comprises essentially of, by weight, >35% $Si_2O_3$, 1-25% CaO, 1-15% $Fe_2O_3$, 1-10% $R_2O$, and an amount of $Al_2O_3$ such that the ratio of $Si_2O_3:Al_2O_3$ is greater than or equal to 1. Alkali resistance can be improved by forming a passivity layer on the surface of glass articles by treating the articles hydrothermally in a basic environment. Optionally zirconia and/or titania may be added to the composition to further improve alkali resistance.

6 Claims, 5 Drawing Sheets

U.S. PATENT DOCUMENTS

| | | |
|---|---|---|
| 3,150,947 A | 9/1964 | Bland |
| 3,215,505 A | 11/1965 | Schmalfeld et al. |
| 3,256,105 A | 6/1966 | Alford |
| 3,279,905 A | 10/1966 | Wood et al. |
| 3,293,014 A | 12/1966 | Callender et al. |
| 3,297,411 A | 1/1967 | Dear |
| 3,321,414 A | 5/1967 | Vieli |
| 3,341,314 A | 9/1967 | Vukasovich et al. |
| 3,348,956 A | 10/1967 | Ekdahl |
| 3,365,315 A * | 1/1968 | Beck et al. .................... 501/33 |
| 3,495,961 A | 2/1970 | Lange |
| 3,560,185 A | 2/1971 | Nylander |
| 3,560,186 A | 2/1971 | Nylander |
| 3,736,162 A | 5/1973 | Chvalovsky et al. |
| 3,752,685 A | 8/1973 | Honda et al. |
| 3,782,985 A * | 1/1974 | Gebhardt .................... 106/679 |
| 3,838,998 A | 10/1974 | Matthews et al. |
| 3,873,475 A | 3/1975 | Pechacek et al. |
| 3,877,918 A | 4/1975 | Cerbo |
| 3,887,386 A | 6/1975 | Majumdar |
| 3,888,957 A | 6/1975 | Netting |
| 3,904,377 A | 9/1975 | Honda et al. |
| 3,904,424 A | 9/1975 | Aoki et al. |
| 3,909,283 A | 9/1975 | Warnke |
| 3,924,901 A | 12/1975 | Phillips |
| 3,954,390 A | 5/1976 | Akhundov et al. |
| 4,002,482 A | 1/1977 | Coenen |
| 4,046,548 A | 9/1977 | Wood et al. |
| 4,057,908 A | 11/1977 | Mirliss et al. |
| 4,059,423 A | 11/1977 | De Vos et al. |
| 4,102,773 A | 7/1978 | Green et al. |
| 4,111,713 A | 9/1978 | Beck |
| 4,133,854 A | 1/1979 | Hendricks |
| 4,153,439 A | 5/1979 | Tomic et al. |
| 4,161,389 A | 7/1979 | Staffin et al. |
| 4,205,992 A | 6/1980 | Mogensen et al. |
| 4,217,335 A | 8/1980 | Sasaki et al. |
| 4,226,841 A | 10/1980 | Komeya et al. |
| 4,234,344 A | 11/1980 | Tinsley et al. |
| 4,235,753 A | 11/1980 | Brown et al. |
| 4,235,836 A | 11/1980 | Wassell et al. |
| 4,243,421 A | 1/1981 | Kume |
| 4,252,193 A | 2/1981 | Powers et al. |
| 4,292,206 A | 9/1981 | Barnes, Jr. et al. |
| 4,303,732 A | 12/1981 | Torobin |
| 4,304,604 A | 12/1981 | Daerr et al. |
| 4,305,758 A | 12/1981 | Powers et al. |
| 4,307,142 A | 12/1981 | Blitstein et al. |
| 4,330,634 A * | 5/1982 | Rodaway .................... 521/65 |
| 4,332,618 A | 6/1982 | Ballard |
| 4,336,338 A | 6/1982 | Downs et al. |
| 4,340,407 A | 7/1982 | Anderson et al. |
| 4,347,155 A | 8/1982 | Jenkins |
| 4,362,566 A | 12/1982 | Hinterwaldner et al. |
| 4,363,878 A | 12/1982 | Yamamoto et al. |
| 4,370,166 A | 1/1983 | Powers et al. |
| 4,394,346 A | 7/1983 | Morooka |
| 4,411,847 A | 10/1983 | Netting et al. |
| 4,430,108 A | 2/1984 | Hojaji et al. |
| 4,448,599 A * | 5/1984 | Mackenzie et al. ............ 65/21.4 |
| 4,475,936 A | 10/1984 | Aston et al. |
| 4,487,620 A | 12/1984 | Neusy et al. |
| 4,501,830 A | 2/1985 | Miller et al. |
| 4,504,320 A | 3/1985 | Rizer et al. |
| 4,512,736 A | 4/1985 | Wader et al. |
| 4,519,777 A | 5/1985 | Akhtyamov et al. |
| 4,538,530 A | 9/1985 | Whitman |
| 4,540,629 A | 9/1985 | Sands et al. |
| 4,595,662 A | 6/1986 | Mochida et al. |
| 4,602,962 A | 7/1986 | Fehlmann et al. |
| 4,621,024 A * | 11/1986 | Wright ........................ 428/404 |
| 4,623,390 A | 11/1986 | Delmonico |
| 4,624,798 A | 11/1986 | Gindrup et al. |
| 4,629,413 A | 12/1986 | Michelson et al. |
| 4,637,990 A | 1/1987 | Torobin |
| 4,643,753 A | 2/1987 | Braun |
| 4,652,433 A * | 3/1987 | Ashworth et al. ........... 423/112 |
| 4,652,535 A | 3/1987 | Mackenzie et al. |
| 4,657,810 A | 4/1987 | Douden |
| 4,661,137 A | 4/1987 | Garnier et al. |
| 4,677,022 A | 6/1987 | Dejaiffe |
| 4,687,752 A | 8/1987 | Peters |
| 4,749,398 A | 6/1988 | Braun |
| 4,751,202 A * | 6/1988 | Toussaint et al. .............. 501/33 |
| 4,751,203 A * | 6/1988 | Toussaint et al. .............. 501/33 |
| 4,752,061 A | 6/1988 | Dalton et al. |
| 4,767,726 A | 8/1988 | Marshall |
| 4,769,189 A * | 9/1988 | Douden ........................ 264/15 |
| 4,784,839 A | 11/1988 | Bachelard et al. |
| 4,818,289 A | 4/1989 | Mäntymäki |
| 4,818,290 A | 4/1989 | Tuovinen |
| 4,819,289 A | 4/1989 | Gibbs |
| 4,826,788 A | 5/1989 | Dennert et al. |
| 4,830,989 A | 5/1989 | Trivedi et al. |
| 4,837,069 A | 6/1989 | Bescup et al. |
| 4,851,203 A | 7/1989 | Bachelard et al. |
| 4,867,931 A | 9/1989 | Cochran, Jr. |
| 4,871,495 A | 10/1989 | Helferich et al. |
| 4,882,302 A | 11/1989 | Horiuchi et al. |
| 4,888,057 A | 12/1989 | Nguyen et al. |
| 4,894,081 A | 1/1990 | Neusy et al. |
| 4,904,292 A | 2/1990 | Neusy et al. |
| 4,928,479 A | 5/1990 | Shekleton et al. |
| 4,937,210 A | 6/1990 | Jones et al. |
| 4,946,811 A | 8/1990 | Tuovinen et al. |
| 4,981,666 A | 1/1991 | Yamada et al. |
| 4,983,550 A * | 1/1991 | Goetz et al. .................... 501/33 |
| 5,002,696 A | 3/1991 | White |
| 5,022,897 A | 6/1991 | Balcar et al. |
| 5,064,784 A | 11/1991 | Saito et al. |
| 5,069,702 A | 12/1991 | Block et al. |
| 5,077,241 A * | 12/1991 | Moh et al. .................... 501/84 |
| 5,096,858 A | 3/1992 | Das Chaklader et al. |
| 5,117,770 A | 6/1992 | Hassinen et al. |
| 5,128,114 A | 7/1992 | Schwartz |
| 5,143,534 A | 9/1992 | Kilner et al. |
| 5,154,596 A | 10/1992 | Schwartz et al. |
| 5,164,003 A | 11/1992 | Bosco et al. |
| 5,164,345 A | 11/1992 | Rice et al. |
| 5,176,732 A | 1/1993 | Block et al. |
| 5,190,737 A | 3/1993 | Weimer et al. |
| 5,194,334 A | 3/1993 | Uerdingen et al. |
| 5,217,928 A | 6/1993 | Goetz et al. |
| 5,253,991 A | 10/1993 | Yokota et al. |
| 5,256,180 A | 10/1993 | Garnier et al. |
| 5,292,690 A * | 3/1994 | Kawachi et al. ................ 501/33 |
| 5,349,118 A | 9/1994 | Davidovits |
| 5,384,345 A * | 1/1995 | Naton ........................ 523/218 |
| 5,407,983 A * | 4/1995 | Naton ........................ 524/113 |
| 5,443,603 A | 8/1995 | Kirkendall |
| 5,455,212 A | 10/1995 | Das Chaklader et al. |
| 5,458,973 A | 10/1995 | Jeffs et al. |
| 5,525,556 A | 6/1996 | Dunmead et al. |
| 5,534,348 A | 7/1996 | Miller et al. |
| 5,558,822 A | 9/1996 | Gitman et al. |
| 5,559,170 A | 9/1996 | Castle |
| 5,580,907 A * | 12/1996 | Savin ........................ 523/219 |
| 5,591,684 A | 1/1997 | Kawachi et al. |
| 5,601,789 A | 2/1997 | Ruhl et al. |
| 5,609,833 A | 3/1997 | Ruhl et al. |
| 5,611,833 A | 3/1997 | Brahmbhatt et al. |
| 5,611,883 A | 3/1997 | Tompkins et al. |
| 5,618,173 A | 4/1997 | Ruhl et al. |
| 5,655,853 A | 8/1997 | Wormser |

| | | | | | | |
|---|---|---|---|---|---|---|
| 5,658,656 A * | 8/1997 | Whitney et al. ......... 428/304.4 | EP | 159046 | 10/1985 |
| 5,676,536 A | 10/1997 | Ruhl et al. | EP | 0159173 | 10/1985 |
| 5,676,563 A | 10/1997 | Kondo et al. | EP | 0242872 A1 | 10/1987 |
| 5,743,393 A | 4/1998 | Webb et al. | EP | 0247817 | 12/1987 |
| 5,849,055 A | 12/1998 | Arai et al. | EP | 0359362 B1 | 3/1990 |
| 5,858,083 A | 1/1999 | Stav et al. | EP | 0430995 B1 | 6/1991 |
| 5,883,029 A | 3/1999 | Castle | EP | 0593779 A1 | 4/1994 |
| 5,895,768 A | 4/1999 | Speit et al. | EP | 0601594 A1 | 6/1994 |
| 5,899,256 A | 5/1999 | Rohatgi | EP | 0717675 | 6/1996 |
| 5,925,449 A | 7/1999 | Davidovits | EP | 0801037 B1 | 10/1997 |
| 5,932,347 A | 8/1999 | Rapp et al. | EP | 0891954 B1 | 1/1999 |
| 5,935,699 A | 8/1999 | Barber et al. | EP | 0931778 B1 | 7/1999 |
| 5,967,211 A | 10/1999 | Lucas et al. | EP | 0999232 B1 | 5/2000 |
| 6,027,330 A | 2/2000 | Lifshits | EP | 1156021 | 11/2001 |
| 6,034,155 A | 3/2000 | Espeland et al. | EP | 1172341 | 1/2002 |
| 6,048,593 A | 4/2000 | Espeland et al. | EP | 1891984 A1 | 2/2008 |
| 6,105,888 A | 8/2000 | Goehner et al. | GB | 413294 | 7/1934 |
| 6,171,651 B1 * | 1/2001 | Brown ................. 427/216 | GB | 682432 | 11/1952 |
| 6,207,077 B1 | 3/2001 | Burnell-Jones | GB | 0740145 | 11/1955 |
| 6,214,309 B1 | 4/2001 | Shaw et al. | GB | 743866 | 1/1956 |
| 6,254,845 B1 | 7/2001 | Ohashi et al. | GB | 744070 | 2/1956 |
| 6,254,981 B1 | 7/2001 | Castle | GB | 752345 | 7/1956 |
| 6,258,456 B1 | 7/2001 | Meyer | GB | 896910 | 5/1962 |
| 6,360,563 B1 | 3/2002 | Gerhardt et al. | GB | 1062410 | 3/1967 |
| 6,367,288 B1 | 4/2002 | Lindner et al. | GB | 1066768 | 4/1967 |
| 6,387,302 B1 | 5/2002 | Konya et al. | GB | 1448320 | 9/1976 |
| 6,444,162 B1 | 9/2002 | Anshits et al. | GB | 1493203 | 11/1977 |
| 6,461,988 B2 | 10/2002 | Budd et al. | GB | 1493203 A | 11/1977 |
| 6,486,084 B2 | 11/2002 | Oda et al. | GB | 1515521 | 6/1978 |
| 6,506,819 B1 | 1/2003 | Shukla et al. | GB | 1532922 | 11/1978 |
| 6,531,222 B1 | 3/2003 | Tanaka et al. | GB | 2019386 A | 10/1979 |
| 6,551,567 B2 | 4/2003 | Konya et al. | GB | 2025928 | 1/1980 |
| 6,572,697 B2 | 6/2003 | Gleeson et al. | GB | 1584175 | 2/1981 |
| 6,582,819 B2 | 6/2003 | McDaniel et al. | GB | 2248834 | 4/1992 |
| 6,620,487 B1 | 9/2003 | Tonyan et al. | GB | 2256867 | 12/1992 |
| 6,626,991 B1 | 9/2003 | Drochon et al. | GB | 2330138 | 4/1999 |
| 6,630,417 B2 | 10/2003 | Kawai et al. | JP | 4104945 | 4/1992 |
| 6,644,162 B1 | 11/2003 | Temple et al. | JP | 07024299 A | 1/1995 |
| 6,648,961 B2 | 11/2003 | Brothers et al. | JP | 07292846 A2 | 11/1995 |
| 6,656,265 B1 | 12/2003 | Garnier et al. | JP | 07315869 A | 12/1995 |
| 6,660,078 B2 | 12/2003 | Brothers et al. | JP | 08169779 | 7/1996 |
| 6,689,286 B2 | 2/2004 | Wilde et al. | JP | 09020526 A | 1/1997 |
| 6,811,603 B2 | 11/2004 | Brothers et al. | JP | 09077543 | 3/1997 |
| 6,814,798 B2 | 11/2004 | Vijn et al. | JP | 9124327 | 5/1997 |
| 6,969,422 B2 | 11/2005 | Mazany et al. | JP | 09255383 A | 9/1997 |
| 7,112,549 B2 | 9/2006 | Yoshitomi et al. | JP | 10095648 | 4/1998 |
| 7,651,563 B2 | 1/2010 | Datta et al. | JP | 10152356 A | 6/1998 |
| 7,666,505 B2 | 2/2010 | Datta et al. | JP | 11116299 A | 4/1999 |
| 2001/0043996 A1 | 11/2001 | Yamada et al. | JP | 2000119050 | 4/2000 |
| 2002/0004111 A1 | 1/2002 | Matsubara et al. | JP | 2000143307 A | 5/2000 |
| 2002/0025436 A1 | 2/2002 | Meyer | JP | 2000302498 | 10/2000 |
| 2002/0043996 A1 | 4/2002 | Iwamoto | JP | 2001163647 A | 6/2001 |
| 2003/0100434 A1 | 5/2003 | Yoshitomi et al. | JP | 2001240439 A | 9/2001 |
| 2003/0177955 A1 | 9/2003 | Vijn et al. | JP | 2002003248 | 1/2002 |
| 2004/0079260 A1 * | 4/2004 | Datta et al. ............. 106/815 | JP | 2002037645 | 2/2002 |
| 2004/0080063 A1 | 4/2004 | Datta et al. | JP | 2002037680 | 2/2002 |
| 2004/0081827 A1 * | 4/2004 | Datta et al. ............. 428/384 | JP | 2002231865 A | 8/2002 |
| 2004/0262801 A1 | 12/2004 | Hojaji et al. | JP | 200373756 A | 3/2003 |
| 2005/0011412 A1 | 1/2005 | Vijn et al. | RU | 2039019 C1 | 7/1995 |
| 2008/0095692 A1 | 4/2008 | Pham | SU | 1650196 A | 5/1991 |
| 2008/0096018 A1 | 4/2008 | Zhang et al. | SU | 1724613 A1 | 4/1992 |
| 2009/0076196 A1 | 3/2009 | Hojaji | WO | WO 82/03386 | 10/1982 |
| 2009/0156385 A1 | 6/2009 | Biscan et al. | WO | WO 83/01947 | 6/1983 |
| | | | WO | WO-8500361 | 1/1985 |
| FOREIGN PATENT DOCUMENTS | | | WO | WO 85/02394 | 6/1985 |
| | | | WO | WO-8700827 | 2/1987 |
| DE | 3213521 A1 | 6/1983 | WO | WO-9002102 | 3/1990 |
| DE | 3314796 A1 | 10/1984 | WO | WO-9210440 | 6/1992 |
| DE | 3908172 A1 | 9/1990 | WO | WO-9507177 | 3/1995 |
| DE | 19962137 A1 | 6/2001 | WO | WO-9607538 | 3/1996 |
| EP | 0033133 | 8/1981 | WO | WO-9803284 | 1/1998 |
| EP | 0036275 | 9/1981 | WO | WO-9829353 | 7/1998 |
| EP | 0102092 | 3/1984 | WO | WO-0172863 | 10/2001 |

| WO | WO-2004018090 A1 | 3/2004 |
| WO | WO-2004101137 A1 | 11/2004 |
| WO | WO-2007067774 | 6/2007 |
| WO | WO 2006/091929 A3 | 9/2007 |

OTHER PUBLICATIONS

FR 2671072 (Jul. 3, 1992) Garnier et al. abstract only.*
EP 1160212 (Dec. 5, 2001) Matsubura et al. abstract only.*
International Preliminary Report on Patentability and Written Opinion of the International Searching Authority for PCT/US2008/006799, issued Aug. 28, 2007, 11 pp.
Amaral, S.T., Muller, I.L., Passivation of pure iron in alkaline solution containing silicate and sulphate, Corrosion Science, 1999, 747-758, V. 41.
Drogowska, M., Brosard, L., Menard, H., Influence of anions on the passivity behavior of copper in alkaline solutions, Surface and Coatings Technology, 1988, 383-400, V. 34.
Hoar, T.P., The production and breakdown of the passivity of metals, Corrosion Science, 1967, 341-355, V. 7.
Johnson, C.A., Kersten, M., Zielger, F., Moor, H.C., Leaching behaviour and solubility—controlling solid phases of heavy metals in municipal solid waste incinerator ash, Waste Management, 1996, 129-134, V. 16(1-3).
Joshi, P.S., Venkateswaran, G., Venkateswarlu, K.S., Passivation of carbon steel alloy in de-oxygenated alkaline pH media, Corrosion Science, 1993, 1367-1379, V. 34(8).
Novakovsky, V.M., Electrochimica Acta: Thermodynamic and kinetic causes of passivity, 1965, 353-365, V. 10.
Omurtag, Y. and Doruk, M., Corrosion Science: Some investigations on the corrosion characteristics of Fe-Si alloys, 1970, 225-231, V. 10.
Singh, R. and Dutta, P.K., Microporous and Mesoporous Materials: Stabilization of natural Faujasite zeolite: possible role of alkaline earth metal ions, 1998, 103-109, V. 21.
Stolica, N., Corrosion Science: Pitting corrosion on Fe—Cr and Fe—Cr—Ni alloys, 1969, 455-470, V. 9.
Sukhotin, A.M. and Kartashova, K.M., Corrosion Science: The passivity of iron in acid and alkaline solutions, 1965, 393-407, V. 5.
Tack, F.M, Callewaert, O.W.J.J., and Verloo, M.G., Environmental Pollution: Metal solubility as a function of pH in a contaminated dredged sediment affected by oxidation, 1996, 199-208, V. 91.
Tourky, A.R., Abdul Azim, A.A., and Sanad, S.H., Corrosion Science: Further studies on the effect of C-content on the corrosion and passivity of Fe*, 1968, 857-870, V. 8.
3M Material Safety Data Sheet 3M Glass Bubbles, Types K and S, Apr. 10, 2006, 7 pp.
Digital Fire Corporation "Do You Need to Know About Eutectics to Make a Good Glaze?" (4 pgs), dated Jul. 14, 2003, http://www.digitalfire.ab.ca/cermat/education/119.php?PHPSESSID=1e2d7f3f3a24698394ecaae57ed3b06d5.
Drozhzhin et al., "Technical Monitoring of Microspheres from Fly Ashes of Electric Power Stations in the Russian Federation" 2005, (8 pgs).
Corning Glass Works, Glass, reprinted version of the Encyclopedia of Chemical Technology, (vol. 10) 2nd ed., pp. 542-543, 1955.
Gubka, "Composition and Morphology of Cenospheres" printed Jul. 11, 2006 located at website: http://www.atom.nw.ru/rie/projects/gubka/properties/cenospheres.shtml (2 pgs).
Pawlowski et al. "Novel raw material for producing heat insulating materials" Silikattechnik 1982; 33(11):339-340.
Sphere Services Inc. "Cenospheres—Hollow Ceramic Microspheres," dated May 15, 2007, http://www.sphereservices.com/ceno.html (2 pgs).
Technology Education, Glass by Encyclopedia Britannica (4 pgs), dated May 15, 2007, http://www.geocities.com/tech_ed_2000/industrial/manufacturing/glass/glass.htm.
What Are Cenospheres, Jul. 11, 2006, http://www.microspheres.co.za/contents.htm (5 pgs).
Office Action for JP 529583 dated Aug. 18, 2009, with translations, 18 pp.
Litigation documents corresponding to Civil Case Nos. SCVSS115246, 5:04-CV-00674-RT-SGL, 04-C-1621, 05-CV-44, and 04-CV-152 (2004).
Kolay, et al. "Physical, chemical, mineralogical, and thermal properties of cenospheres from an ash lagoon" Cement and Concrete Research 2001;31:539-542.
Derwent Abstract Accession No. 2009-E28129, CN 101337822, published Jan. 7, 2009.

* cited by examiner

ALKALI RESISTANT GLASS COMPOSITIONS

CROSS-REFERENCE TO RELATED APPLICATIONS

This application claims the benefit of priority under 35 U.S.C. §119(e) of U.S. Provisional Application Number 60/656,579 filed on Feb. 24, 2005 and entitled ALKALI RESISTANT GLASS COMPOSITIONS, the entirety of which is incorporated herein by reference.

BACKGROUND OF THE INVENTION

1. Field of the Invention

The present invention relates generally to the field of glass compositions, and more particularly, to alkaline resistant glass compositions suitable as fillers and modifiers.

2. Description of the Related Art

It is well known that introducing glass fibers improves the mechanical properties of many materials, such as cementitious products and various polymers. In particular, glass fibers improve the tensile strength of the composite cementitious or polymeric products. Similarly, expanded glass microparticles can be used to impart low density to cementitious and polymeric composites. Such microparticles may also have other beneficial effects, such as reducing moisture movement, thermal movement, improving thermal insulation value or improving workability. However, in a strong alkaline environment, silicate glasses are subject to rapid corrosive attack. This phenomenon has severely limited the use of glass in reinforcing concrete, which exhibits strong alkalinity during curing. For example, during the hydration of Portland cement, calcium hydroxide is formed as a reaction byproduct. In addition, alkali metal impurities are solubilized in the form of hydroxides.

Several approaches have been used to retard alkaline attack on glass in cement environments. One approach is to polymer coat the glass which, while somewhat effective at protecting the glass from corrosive attack, results in a weak mechanical bond to the surrounding cement matrix.

Another approach is to develop better alkaline resistant glass (AR glass) by altering its chemical composition. Common commercially available glass compositions that have been used for this purpose include E-glass which typically consists essentially of 54% $SiO_2$, 14% $Al_2O_3$.0.3 $Fe_2O3$, 17.5% CaO, 4.5% MgO, 10% $B_2O_3$, and C-glass, which consists essentially of 65.6% $SiO_2$, 4% $Al_2O_3.Fe_2O_3$, 14% CaO, 3% MgO, 8% $Na_2O.K_2O$, 5.5% $B_2O_3$ and 0.5% $K_2O$, (Kirk-Othmer, *Encyclopedia of Chemical Technology*, $2^{nd}$ *Edition*, Volume 10, 1966.) However, these glasses are susceptive to alkaline dissolution at high pH levels and are therefore not suitable as additives in many cementitious compositions. Accordingly, their use as a material enhancing additives has been primarily limited to less aggressive polymers.

Currently, alkali resistant glasses are made by adding refractory oxides such as zirconia and titania. One group of alkali resistant glasses is those containing appreciable amounts of zirconia ($ZrO_2$). Zirconia Alkali resistant (ZAR) glass compositions generally have high zirconia content, oftentimes in the range of 15-20 wt. % or more. One example of such a commercially available glass is sold under the trade name CEM-FIL® by Vetrotex Cem-Fil S.L. in Alcalá de Henares, Spain for use as a reinforcing fiber in cement. However, the addition of zirconia raises the melting temperature of the glass composition, which greatly increases the processing cost. To counteract the negative effects of $ZrO_2$, alkali oxides are typically added to reduce the melting temperature to a more workable level. In many cases, more than 10 wt. % alkali oxides are added to reduce the melting temperature to a more workable level of the zirconia silicate system.

The good performance of ZAR glasses in high alkaline environments is believed to be due to the relatively low solubility of Zr—O—Zr species. In some applications, titania may be added to further improve the durability of the glass. However, the addition of titania presents additional drawbacks, such as further increases in melting temperature, which increases the processing cost, and additionally increases the susceptibility of the glass to divitrification. Therefore, while the addition of titania may provide some benefits, there are associated costs in terms of materials and processing.

While available ZAR glasses have been used in fiber cement products with some success, both zirconia and titania are very expensive when compared with the cost of other raw glass materials, and therefore, the material cost prohibits this type of glass from widespread use in the cement industry. Moreover, even the expensive ZAR glasses are subject to corrosion damage in harsh alkaline solution environments, such as hydrating cement.

While tests have shown that ZAR glass exhibits improved corrosion resistance over other glass types, the corrosive effects of an alkaline solution on glass are exacerbated as the temperature is increased. The majority of accelerated durability tests on glass compositions for use in alkaline environments have been carried out at temperatures around or below 100° C., e.g. 90° C. in strong alkaline solutions. For example, ASTM C 1203-91 specifies a test method for quantitative determination of alkali resistance of ceramic-glass enamel based on the weight loss in 10 wt. % NaOH in water. The test duration is 2 hours and the temperature is 95° C. The international tests ISO 695-1991 and DIN 52322 both make use of a mixture of equal volumes of 1 M NaOH and 0.5 M $Na_2CO_3$ at a temperature of 102.5° C. for 3 hours.

However, certain cementitious products are rapidly cured at temperatures well beyond 100° C. In fact, curing temperatures of high performance fiber cement products can be as high as 180° C., or even higher under high temperature hydrothermal conditions. It has been noted that in strong alkaline solutions, the rate of corrosion attack commonly doubles for each 10° K increase in temperature.

Harsh curing conditions are normally experienced when green cement products are cured in an autoclave, and cement inclusions are exposed to pH levels typically within the range of 12.5 to 14, and temperatures can reach as high as 180° C. or higher. In such an aggressive alkali environment, the glassy materials must possess even higher chemical durability in order to withstand excessive dissolution in the high temperature cementitious matrix. Dissolution is not desirable, since it not only degrades the mechanical integrity of the composite where the glassy materials form the inclusions, but it may change the chemistry of the cementitious region in the immediate vicinity of the glassy materials. Both of these results reduce the quality of the cementitious composites.

Further, polymeric materials are known to be reinforced with glass fiber or glass mesh and exposed to alkaline environments. While the polymers themselves may resist corrosive attack, the embedded glass materials may still be susceptible to corrosive attack.

Accordingly, there remains a need for an improved glass which is highly resistant to the corrosive effects of basic environments, including but not limited to alkaline environments. Further, there is a need for an improved glass that is highly resistant to an alkaline environment at elevated temperatures beyond 100° C. Additionally, the amount of fibers typically used to reinforce cement and polymers is quite large, even reaching 20% or more of the total cement or polymer composite by weight. Therefore, it is particularly important that glass fibers or materials made for cementitious and polymeric applications are manufactured economically.

SUMMARY

Embodiments described herein provide novel glass compositions that exhibit excellent alkali resistant properties, even at elevated temperatures. It has been found unexpectedly that compositions having a high concentration of alkaline earth metal oxides and iron oxide, while maintaining a low concentration of alkali metal oxides, exhibit exceptional alkali resistance at high pH levels, even at elevated temperatures. Moreover, the materials used in the composition are readily available, thus making the composition much more economical to manufacture than typical ZAR glasses.

In one embodiment, an alkali resistant glass consists essentially of, by weight percent:

| | |
|---|---|
| $SiO_2$ | >35% |
| CaO | 1-25% |
| $Fe_2O_3$ | 1-15% |
| $R_2O$ | 1-10%, | and
an amount of $Al_2O_3$ such that $SiO_2:Al_2O_3 \geq 1$; wherein R=Na, K, and/or Li.

The alkali resistant glass may be formed such that the combination of CaO and $Fe_2O_3$ is greater than or equal to about 10 wt. %, more preferably greater than about 20 wt. %, and in some embodiments, greater than about 30 wt. %. In addition, some embodiments include a combination of $SiO_2$ and $Al_2O_3$ between about 35-90 wt. %. Optionally, the alkali resistant glass may further include up to about 15 wt. % of $ZrO_2$ and $TiO_2$ combined. Optionally, in some embodiments, CaO may be partially or completely replaced by MgO. Finally, in some preferred embodiments, the ratio of CaO:$R_2O$ is greater than unity.

The alkali resistant glass may be formed as a fiber, a hollow sphere, a solid sphere, or other shape and aggregates thereof. The alkali resistant glass may also be foamed. The alkali resistant glass may also be combined with other polymer, ceramic or mineral materials to make a composite particle or fiber. In one preferred embodiment, a passivity layer is formed over the surface of the glass. The passivity layer may be formed by hydrothermal treatment in a basic environment. In some embodiments, the basic environment may be a high pH environment where the pH may be greater than 8, 9, 10, 11, 12, 12.5 or 13. In other embodiments the basic environment may comprise a solution of calcium hydroxide, a cement paste or slurry, the pore water found in hydrating cement, an aqueous cementitious matrix, or contain an alkaline metal hydroxide. In one embodiment, high temperature hydrothermal treatment is performed at temperatures between about 100° C. and 250° C.

In some preferred embodiments, the passivity layer is enriched in iron and calcium oxides, or alternatively enriched in magnesium oxide, or a combination thereof. The passivity layer may be either a continuous or a discontinuous layer formed upon or near the surface of the glass. In other embodiments, the passivity layer is a surface layer, and is substantially solid.

According to other embodiments, a cementitious composite article modified cement building sheet has a glass additive material, the glass comprising, by weight percent:

| | |
|---|---|
| $SiO_2$ | >35% |
| CaO | 1-25% |
| $Fe_2O_3$ | 1-15% |
| $R_2O$ | 1-10%, | wherein R is selected from the group consisting of Na, K, and Li; and
an amount of $Al_2O_3$ such that $SiO_2:Al_2O_3 \geq 1$.

In some preferred embodiments, the $Al_2O_3$ content is greater than 1%, more preferably greater than 4%, and in some embodiments, greater than 7%. In some preferred embodiments, the total iron oxide content expressed in term of $Fe_2O_3$ is greater than 1%, more preferably greater than 3%, more preferably greater than 6%, and most preferably greater than 10%. Unlike traditional beliefs, the current inventors have found that the alkaline metal oxide, $R_2O$, content in the composition does not have to be very low for the glass to be durable and alkaline resistant. In some embodiment, the alkaline metal oxide content is greater than 1%, more preferably greater than 2%, most preferably greater than 4%. According to certain preferred embodiments of modified cement building sheets, the glass modifying material is a fiber or a microsphere.

According to yet another embodiment, a method of reinforcing cement includes the steps of providing a mixture comprising Portland cement and water; adding alkali resistant glass particles to the slurry wherein the glass particles consist essentially of, by weight percent:

| | |
|---|---|
| $SiO_2$ | >35% |
| CaO | 1-25% |
| $Fe_2O_3$ | 1-15% |
| $R_2O$ | 1-10%, | wherein R is selected from the group consisting of Na, K, and Li;
an amount of $Al_2O_3$ such that $SiO_2:Al_2O_3 \geq 1$; and mixing the slurry to distribute the glass particles throughout the slurry, wherein the glass particles provide reinforcement to the cement once cured.

Another embodiment discloses a method of increasing the alkali resistance properties of glass, the method comprising providing a glass article consisting essentially of, by weight percent,

| | |
|---|---|
| $SiO_2$ | >35%, |
| CaO | 1-25%, |
| $Fe_2O_3$ | 1-15%, |
| $R_2O$ | 1-10%; | wherein R is selected from the group consisting of Na, K, and Li; and
treating the glass articles by exposing the glass articles to a basic environment to form a passivity layer over the surface of the glass articles thereby improving the alkali resistance of the glass articles. In one embodiment, the treating the glass step is carried out under high temperature hydrothermal conditions, such as in an aqueous environment at a temperature above 100° C. In another embodiment, the treating the glass step is carried out under low temperature hydrothermal conditions, such as at a temperature below about 100° C. The glass articles may be spheres, fibers, or other desired geometries.

A further embodiment includes a synthetic, substantially spherical wall, the wall having an inner surface and an outer surface and a thickness therebetween; at least one void within the spherical wall; and a passivity layer on the outside of the spherical wall. The passivity layer may substantially cover the outer surface of the spherical wall, and in some embodiments has a thickness less than the thickness of the spherical wall. However, in many preferred embodiments, the passivity layer thickness is less than about 10%, or 5%, or 2% of the spherical wall thickness. The passivity layer is preferably substantially chemically inert in a basic environment having a pH of about 12-14, thus increasing the spherical wall's durability in a high pH environment.

In yet another embodiment, an alkali resistant glass is provided wherein the glass comprises a silicate based glass. The alkali resistant glass further comprises a passivity layer formed on an exterior surface of the silicate based glass body, wherein the passivity layer has a composition that is different than the composition of the glass body. The passivity layer preferably comprises a substance, wherein the substance is native to the glass body. The substance in combination with other substances results in the passivity layer being substantially chemically inert in an alkaline environment.

DETAILED DESCRIPTION OF PREFERRED EMBODIMENTS

Figure 1A:
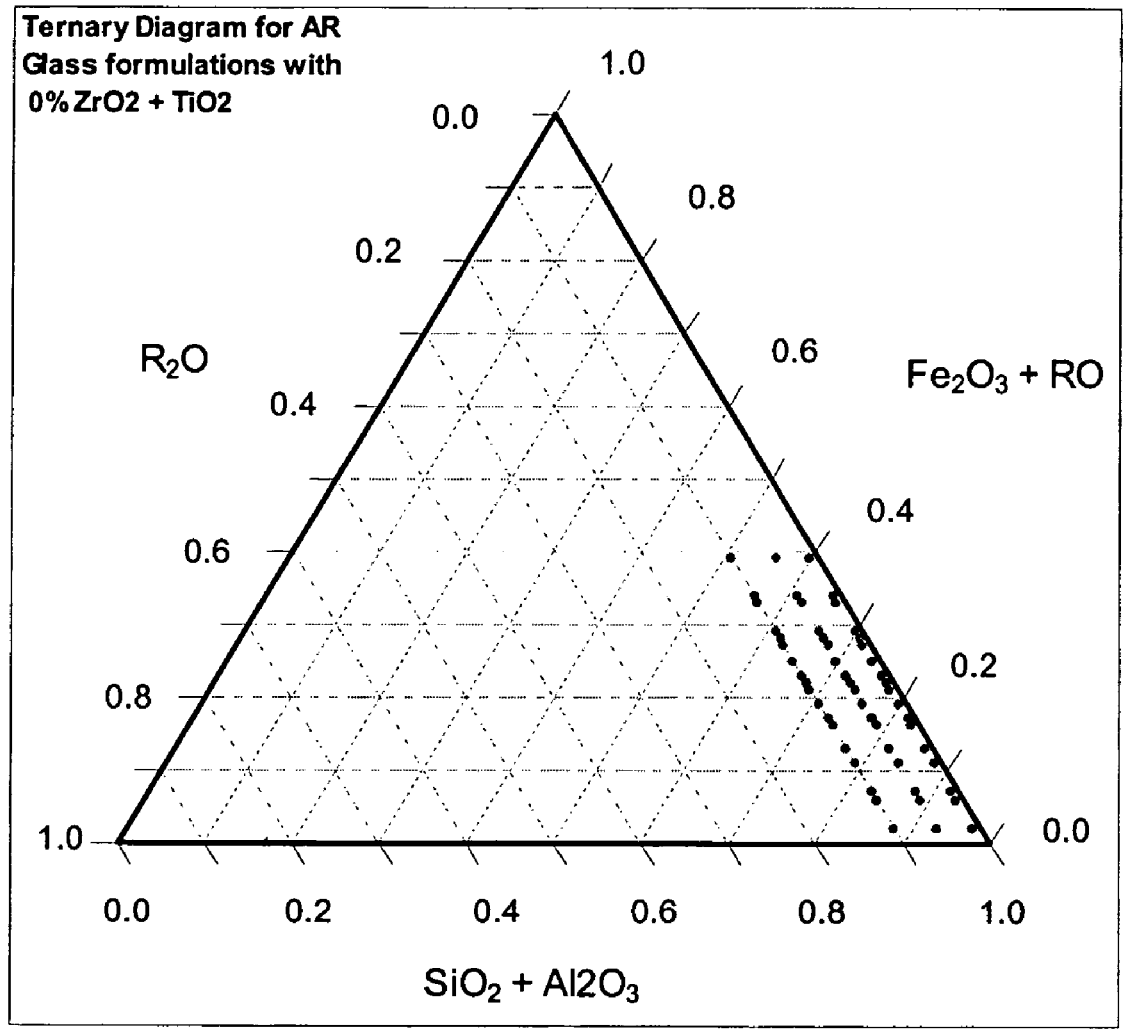
FIG. 1A is a ternary diagram for an alkali resistant glass formulation having 0% $ZrO_2+TiO_2$.

The following description reveals improved glass compositions and products having excellent alkali resistance properties, even at elevated temperatures that are formed from abundant and low cost materials. Glass articles having the characteristics described herein may be incorporated into composite materials comprising either organic polymer matrices or inorganic binder matrices or into other media where the described benefits are desirable. The disclosed glass articles may be formed as fibers, particles, composite aggregates, solid or hollow spheres, micro balloons or any other configuration deemed desirable for the particular application. The compositions disclosed herein may also be used as a filler material to improve the alkali resistance of ceramic matrix composites, metal matrix composites, polymer composites, cementitious composites, or clay-based composites. Accordingly, the use of specific glass articles, such as fibers or spheres, or as a component in a glass-based composite or glass alloy in the following discussion is exemplary only, and should not be construed as limiting. In addition, inorganic based matrix examples in the following specification include other matrix materials such as cementitious binders, geopolymers, metals, and clay products. The cementitious term applies to all types of cements including, but not limited to, Portland cement, lime cement, aluminous cement, sorel cement, pozzolanic cement, geopolymeric cement, gypsum, cement pastes, dry cement mixes, and other hydraulically settable binders.

According to embodiments disclosed herein, a glass composition may be formed having a high concentration of alkaline earth metal oxides and iron oxide, while maintaining a low concentration of alkali metal oxides. These types of compositions have been found to perform exceptionally well at high pH levels and under hydrothermal conditions.

It has been recognized that the chemical durability of silicate glasses in an aqueous environment strongly depends on their composition. Of particular interest are the roles of certain oxides, such as $Al_2O_3$, forming negatively charged tetrahedral $[AlO_4]^-$ groups with the negative charge balanced by the positive charge on an alkali metal ion. Thus, in the presence of such oxides, alkali ions can be incorporated into the glass without reducing its durability. This accounts for the role of $B_2O_3$ and $Al_2O_3$ in the production of durable glasses. Other oxides, such as $ZrO_2$ and $TiO_2$ can replace $SiO_2$ on a one to one basis in the glass network. However, this mechanism indicates that the effect of a glass component on overall corrosion resistance depends on the content of other components. For instance, in the absence of an excess of alkali oxides over $B_2O_3$ and $Al_2O_3$, the two latter oxides assume a triangular or octahedral, rather than tetrahedral coordination, and they no longer contribute to improved durability.

The change balance of an alkali metal ion with an aluminosilicate network can be understood by consideration of crystalline albite ($NaAlSi_3O_8$). Albite is an open aluminosilicate network in which both Si and Al are four fold coordinated by oxygen to form tetrahedra arranged as three-dimensionally interconnected cages. All oxygen atoms in this crystalline structure "bridge" between either Si or Al cations through covalent bonds. The negative $[AlO_4]^-$ groups are charge compensated by Na+ ions which occupy the oxygen-rich sites. Similar features can be expected in aluminosilicate glasses.

In glasses with equal parts $Al_2O_3$ and $Na_2O$, the $Na^+$ cations can be described as filling the oxygen rich cavities of the fully-polymerized former network, thereby tying up negatively charged $[AlO_4]^-$ groups. In this case, ionic bonds form between sodium ions and oxygen thus reducing the degree of openness of the glass network, thus maintaining the alumina in the glass network.

On the other extreme, in binary glasses, the $Na^+$ cations are tethered to the silicate network through non-bridging oxygens (NBO's), thus opening up the glass network, which is not particularly desirable for chemical durability.

In the pH range of about 12.5-14, which is the expected pH range found in aqueous media within the bulk of hydrating cement, the major components of many glasses are not durable and will become solubilized. More specifically, at high pH levels, silica is converted to silicic acid and alumina reacts to form aluminum hydroxide. Thus, alumina will not have the same beneficial effect on glass durability as it would have had at neutral or weakly basic environments.

A similar behavior is expected with many other common glass components, such as ZnO, $SnO_2$, PbO, $P_2O_5$, $GeO_2$, and other well-known glass components. Thus, glass manufacturers have historically believed that glassy materials within cementitious composites require relatively high concentrations of typical refractory oxides such as silica, zirconia, titania, and alumina, and a low concentration of alkali oxides to improve their durability. The increased refractory oxides provide the alkali resistance not inherent in many common glass components, but as a result of the high concentration of refractory oxides, most alkali resistant glasses of this type are relatively costly, and their use has been limited to only special applications when cost becomes less important than high tensile strength achieved by fiber reinforcement.

It has been found that while many oxides become more soluble due to anionic dissociation at high pH levels, the alkaline earths, and the lanthanides become less soluble at increasingly high pH. In fact, testing has shown that the maximum solubility of calcium reaches values of 1, $10^{-2}$, $10^{-4}$, and $10^{-6}$ M at pH values of approximately 11.5, 12.5, 13.5 and 14.5, respectively.

Thus, preferred embodiments of the present invention include levels of calcium not typically seen in traditional glass making, and in some embodiments, calcium levels are about 1-25 wt. %, more preferably, 5-20 wt. %, and even more preferably 10-15 wt. %.

Interestingly, leach testing in an alkaline environment indicates that other materials added to the composition can offset the benefits of high calcium. For example, tests have shown that high levels of alkali metals, such as greater than about 10 wt. % of either $Na_2O$ or $K_2O$ or a combination of both, have deleterious effects on the durability of the glass composition, even in the presence of relatively high levels of calcium. Therefore, the inventors believe that high concentrations of calcium alone will not provide the desired durable glass, but that there are other elements that interact with the increased levels of calcium to provide the desired alkali resistant glass properties, and in some preferred embodiments, the $CaO/Na_2O$ molar ratio is believed to be important in alkali resistance. In some preferred embodiments, the $CaO/Na_2O$ molar ratio is typically greater than 1, and in some embodiments, is 2, 3, 4, 5, 10, 15, 20, 25, 30, or more.

While calcium is used herein as exemplary, the inventors believe, without wishing to be bound by theory, that other materials may be used in place of calcium to produce the desired alkali resistant properties. Some of these other materials include, without limitation, MgO and ZnO.

In addition, it has been found unexpectedly that leach testing indicates that in addition to the presence of Si and Al, another factor of importance in stabilizing the leach rate appears to be iron oxide. Statistical analyses indicate that leach rates drop with increasing $Fe_2O_3$, up to about 15 wt. %. Plotting of statistical data shows that the leaching curve drops sharply between about 0 wt. % and 1 wt. % Fe and gradually flattens out toward about 15 wt. % Fe. Thus, without wishing to be bound by this theory, it is believed that an amount of iron oxide, typically in the form of $Fe_2O_3$, up to about 15 wt. % provides improved alkali resistance in combination with the described levels of calcium and the $CaO/Na_2O$ molar ratio. Preferred embodiments include about 1-15 wt. % $Fe_2O_3$, and more preferably between about 5-12 wt. %, and more preferably, between about 7-10 wt. %.

FIG. 1a depicts an illustrative ternary phase diagram of the preferred compositional range according to several preferred embodiments of the present invention, but should in no way be construed as limiting the scope of the invention. FIG. 1a specifically illustrates a ternary phase diagram of glass within a compositional range having no zirconia or titania, according to preferred embodiments of the invention.

Figure 1B:
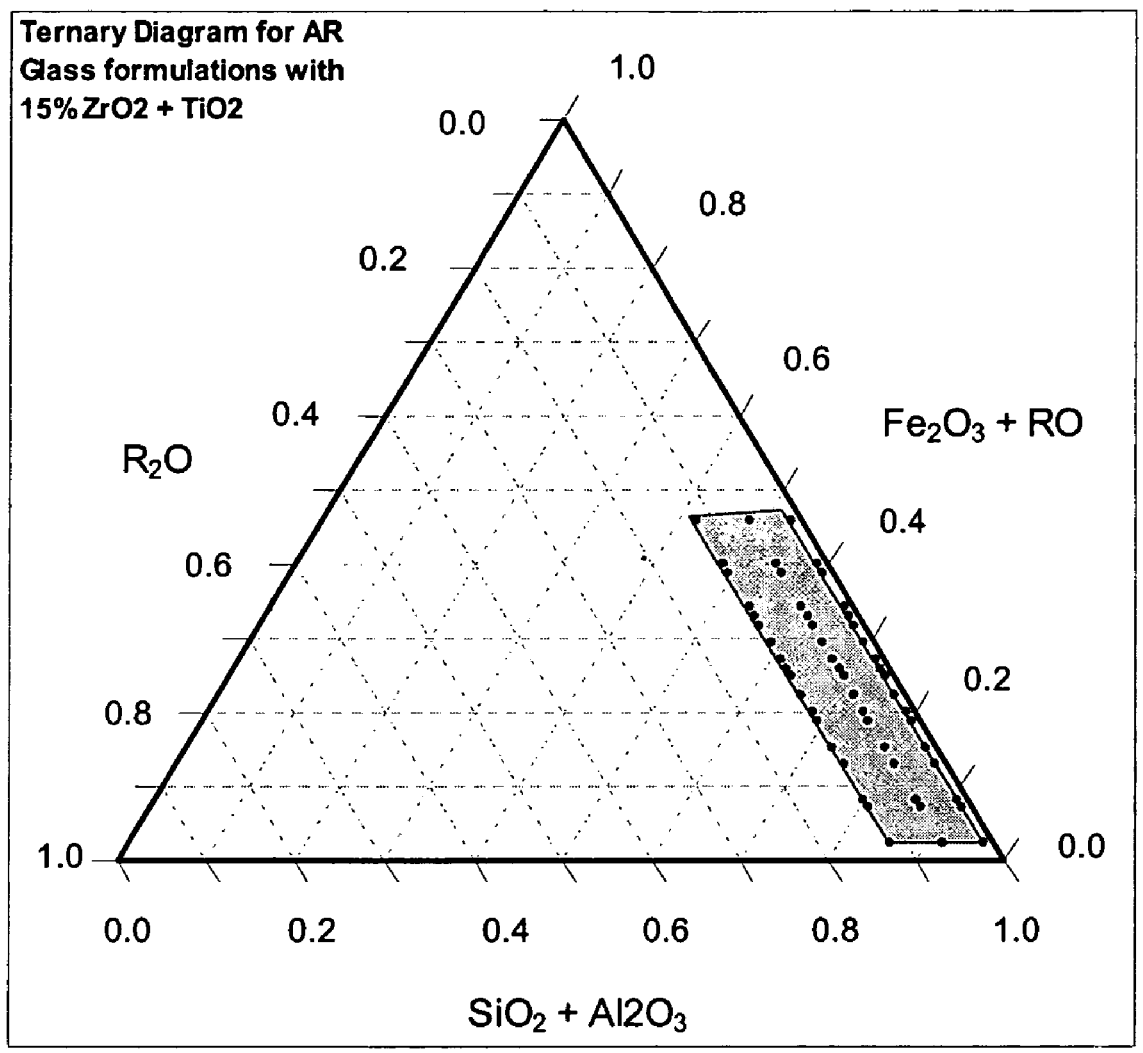
FIG. 1B is a ternary diagram for an alkali resistant glass formulation having up to 15% $ZrO_2+TiO_2$.

FIG. 1b depicts another illustrative ternary phase diagram of another preferred compositional range including zirconia and titania up to a combined 15 wt. %. In this case 85 parts of the material highlighted in FIG. 1b would be combined with 15 parts zirconia or titania to yield a glass formulation consistent with the preferred embodiments of the invention.

As is shown in the following tables containing test data, it has been found unexpectedly that the higher combined concentrations of iron and calcium oxides is more effective than the refractory oxides alone against corrosion in severe aqueous alkaline environments. These findings are more specific to alkali reaction during high temperature hydrothermal curing of cementitious composites in which the curing temperature is typically around 180° C. for a period of about 5-10 hours.

Many of the embodiments disclosed herein, whether in the form of fibers, spheres, or other inclusions, have compositions relatively low in alkali metal oxides, below about 10%, and rich in iron and calcium oxides, with $Fe_2O_3+CaO$ within the range of about 2-40 wt. %. Optionally, $ZrO_2$ and $TiO_2$ can be added to the glass composition to further improve the alkali durability in high alkali environments. Moreover, other oxides such as $P_2O_5$ and ZnO may also be beneficial in further improving the alkali resistance of glass articles in high pH environments.

It has been unexpectedly found that a crystalline layer over the exposed glass ("passivity layer") can be formed on certain glass compositions within the compositional envelope of the present invention by subjecting the glass to hydrothermal conditions in a strong alkaline solution. Hydrothermally treating the glass article at a temperature of about 180° C. in an alkaline solution saturated with calcium hydroxide at a pH level of about 12-14 results in the formation of a passivity layer on the outside surface of the glass article. The passivity layer is shown in FIG. 2b. In several preferred embodiments in which the glass article is a hollow sphere, the passivity layer has a thickness that is preferably less than the sphere wall thickness. In some embodiments, the passivity layer thickness is less than about 10% of the sphere wall thickness, and even more preferably, the passivity layer thickness is less than about 5%, and in some embodiments is less than about 2% of the hollow sphere wall thickness.

The creation of a passivity layer is extremely important because it indicates that the preferred alkali resistant glass formulations disclosed herein are particularly advantageous for cementitious or inorganic polymeric composites. Since cementitious or inorganic polymeric composites generally require curing, hydrating or autoclaving as a step of their manufacturing processes, a passivity layer would simultaneously and integrally be formed on the surface of the glass component within the composite. The glass component, such as, for example reinforcing fibers or microspheres, having a passivity layer would result in a more durable composite than would be possible with other conventional alkali resistant formulations. Hence, one especially preferred embodiment of the present invention is a cementitious, ceramic or inorganic polymeric composite material with inclusions formed from an alkali resistant glass formulation as disclosed herein, wherein the inclusions have a passivity layer that is formed in-situ during manufacturing process of the composite material.

It has been found that incorporating relatively high concentrations of iron and calcium oxides results in the passivity layer formation during hydrothermal treatment. Addition of small percentages of zirconium oxide to the glass compositions rich in iron and calcium oxide further improved the formation and tightness of the passivity layer. Subsequent examination of the passivity layer by energy dispersive x-ray (EDX) analysis revealed the enrichment of iron and calcium oxides and depletion of alkali oxides.

Through experimentation and testing, the inventors have learned that exposure of commercial ZAR glasses to cementitious environments results in an increase in calcium and zirconium content and decrease in silica and alkali content, but does not result in the formation of a passivity layer similar to the present inventive compositions.

EDX examination of the passivity layer formation on spherical glass beads of the inventive glass compositions revealed that the passivity layer formation on glass articles without added zirconia is rich in iron and calcium oxides and low in alkali oxides. The passivity layer formation with the addition of 1-6 wt. % zirconia to the parent glass is enriched in iron and calcium oxides, but not with zirconia. The passivity layer soaks calcium from the surrounding cementitious solution which is saturated with calcium hydroxide. The zirconia does not play a major role in the formation of the passivity layer and it only decreases the intrinsic solubility of silica.

Based upon extensive corrosion testing, the inventors found that glasses made according to embodiments of the present invention have as good, and sometimes better, corrosion resistance as the best commercial glasses that have very high zirconia content, even having as much as 15 wt. % zirconia and more. Electron microscopy of commercial zirconia glasses showed no passivity layer formation similar to the inventive glasses when subjected to the same hydrothermal conditions.

The produced passivity layer provides protection against alkali corrosion during the service life of the cementitious products. This finding was confirmed by first subjecting two glasses with varying amounts of iron and calcium oxides to identical hydrothermal treatment to form the passivity layer. Two samples, Glass A and Glass B were compared for alkali resistance. Glass A was made according to the composition of the present invention and Glass B was a coal ash derived cenosphere which is frequently used as durable glass in cementitious systems. Glass A had twice the iron oxide content and nine times more calcium oxide than Glass B. However, Glass B had almost 1.5 times more alumina than Glass A.

The glass samples were hydrothermally treated and then subjected to a standard accelerated correction test at 90° C. in five molar sodium hydroxide solution. While ASTM C 1203-91 test standards use 10% sodium hydroxide solution in water to measure alkali resistance, due to the high durability of glasses tested, a stronger alkaline solution was chosen for conducting accelerated tests. A 20% sodium hydroxide solution (5 molar) was chosen for the accelerated corrosion tests.

After an 8 hour test, the mass loss due to corrosion was almost twice as much for commercially available Glass B. After one week of testing under the same conditions, the mass loss of Glass B was almost three times that of Glass A. These findings indicate that the passivity layer formation due to the dual presence of iron and calcium oxides outperforms high alumina cenosphere glass compositions.

Figure 2A:
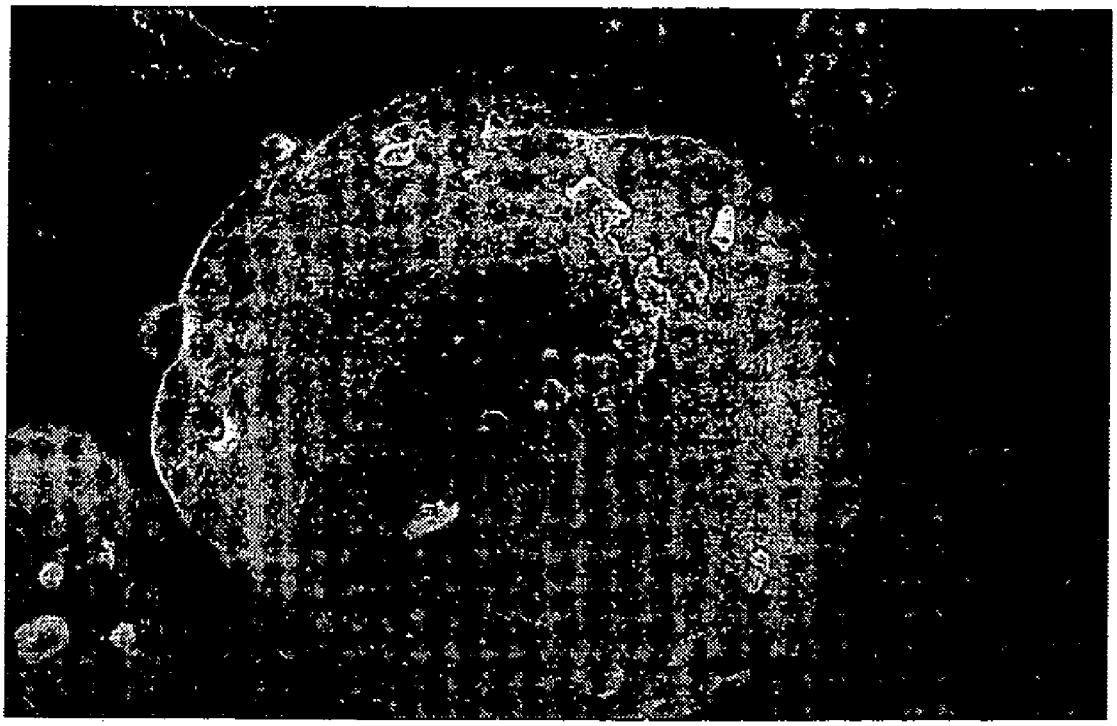
FIG. 2A is a scanning electron micrograph of a cenosphere showing its outer surface.
Figure 2B:
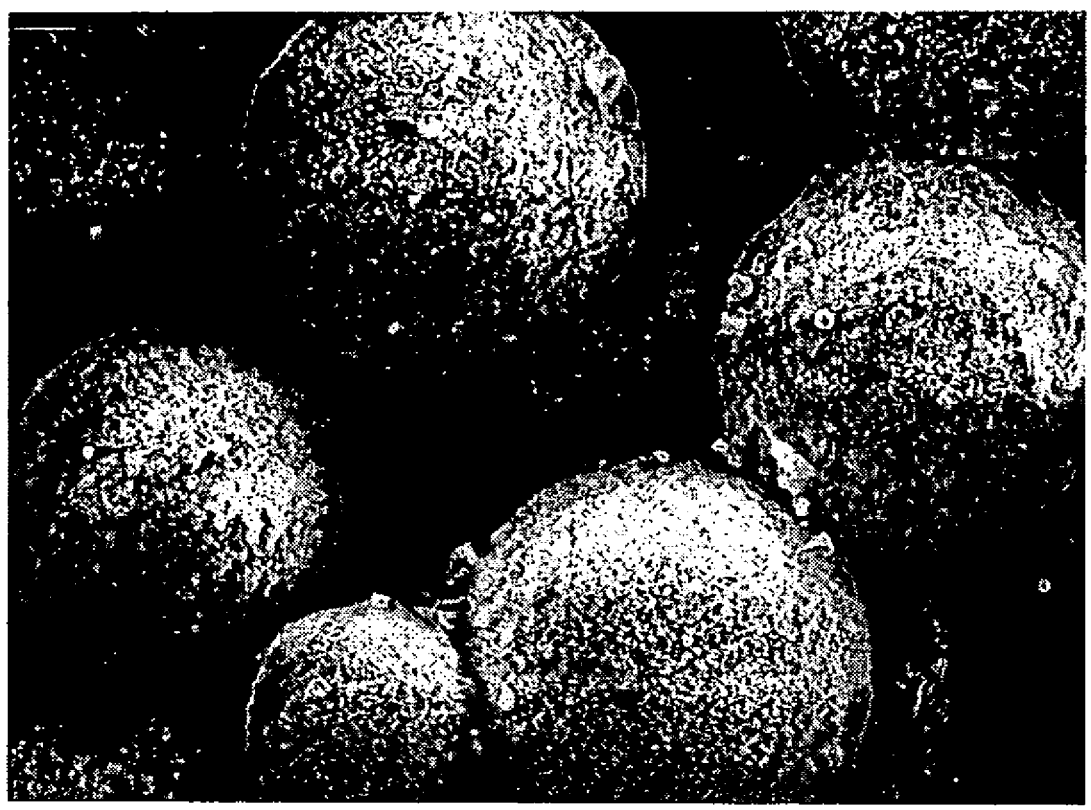
FIGS. 2B and 2C are scanning electron micrographs of glass articles made according to embodiments of the present invention showing the glass articles having a passivity layer.

FIGS. 2a and 2b are scanning electron micrographs (SEM micrographs) of a cenosphere and a glass article embodiment according to the present invention after both being subjected to hydrothermal conditions. As can be seen, the glass article of FIGS. 2b and 2c, produced in accordance with the present invention, show a passivity layer formation. It is believed that the formation of the passivity layer greatly improves the native glasses ability to withstand corrosive attack in high alkali environment.

Subsequent testing and SEM and EDS analysis have shown that commercially available cenospheres and other alkali resistant glasses do not form this type of passivity layer when subjected to similar conditions. Without wishing to be bound by theory, the inventors believe that the passivity layer is formed as material leaches from the glass formulation and is then redeposited onto the surface. This is supported by leaching tests in which leaching of $SiO_2$ and $Al_2O_3$ sharply decreases with time, suggesting that these levels actually redeposit onto the surface of the article, as shown in the following Table 1

TABLE 1

Wt % Leached from inventive glass composition at different time points.

| Element as Oxide | 1 hr Treatment | 5 hrs Treatment | 19 hrs Treatment |
|---|---|---|---|
| $SiO_2$ | 0.24 | 7.8 | 3.3 |
| $Al_2O_3$ | 0.05 | 7.6 | 2.5 |
| $Na_2O$ | 0.49 | 27.6 | 58.1 |
| Total | 0.21 | 6.36 | 5.06 |

As shown in Table 1 above, while leaching of $Na_2O$ increases from 5 hrs to 19 hrs, leaching of $SiO_2$ and $Al_2O_3$ sharply decreases indicating that these two elements redeposit on the surface of the glass article. Accordingly, as expected, the passivity layer has a chemical formulation that is rich in Si and Al. Additionally, the passivity layer further includes Mg, Fe and Ca, as confirmed by EDS analysis. Interestingly, when utilizing the glass compositions described herein, it appears that the addition of zirconia does not substantially influence the formation of the passivity layer, but rather improves the texture and uniformity of the passivity layer.

Accelerated corrosion testing in 20 wt % hydroxide at 95° C. confirmed that spheres made from the glass formulations provided herein and incorporating the passivity layer, proves much stronger alkali resistant characteristics, as shown in the following examples.

Additional testing was performed to measure the alkali resistance of glass articles made from glass compositions described herein along with several commercial alkali resistant glasses. The total fraction of glass dissolved was assessed in a synthetic solution saturated with calcium hydroxide and pH adjusted with lithium hydroxide at 180° C. in a pressurized vessel. This environment is similar to the aqueous environment found in a hydrating cementitious mixture in an autoclave. However, lithium hydroxide was used instead of sodium or potassium hydroxides which are normally present in ordinary cement in order to minimize the background concentrations measured by inductively coupled plasma spectroscopy (ICP). With this substitution, sodium and potassium concentrations were measured accurately in the resulting leach solutions.

Test Data

Examples A and B illustrate the leaching rates of microparticles produced according to methods described herein in comparison with a commercial grade cenosphere product, and several commercially available microspheres.

EXAMPLE A

An aqueous alkaline solution as was prepared with 2.343 g/L of LiOH, and 0.080 g/L of Ca(OH)$_2$ at a pH of about 13.0. The test materials included a commercially available coal ash cenosphere (produced at 4 Corners power plant, and sold by Phoenix Cement), commercial soda lime microspheres (sold under trade name of SISCOR by Spherical Industrial Solutions, Toronto-Canada), and synthetically produced spherical microparticles according to one embodiment of the present invention, identified as sample X. The alkaline solution was heated to 180° C. and the test materials were left to soak for 5 hours. The solid charge was 0.25 g in 15 ml of solution for all the three materials. The leach tests were performed at 180° C. after a duration of 5 hours. Table 2 summarizes the major oxide constituents of the three test specimens.

TABLE 2

|  | Phoenix Cement cenosphere | SISCOR | X |
|---|---|---|---|
| $SiO_2$ | 64.6 | 71.2 | 47.9 |
| $Al_2O_3$ | 25.8 | 3.9 | 20.6 |
| CaO | 0.9 | 9.6 | 13 |
| $K_2O$ | 1.6 | 0.7 | 1.2 |
| $Fe_2O_3$ | 4.1 | 0.3 | 7.7 |
| $TiO_2$ | 0.5 | 0.1 | 1.2 |
| MgO | 1.3 | 1.9 | 3.3 |
| $Na_2O$ | 1.1 | 12.1 | 5 |
| BET surface area m2/g | 1.1 | 1.3 | 1.0 |

From Table 2 (above), the specific surface area of all the three samples are relatively close. Sample X is one preferred embodiment of the present invention. As can be seen, the compositions are different, with sample X having the highest calcium and iron oxide content. Sample X additionally has a much lower silica content than the other samples. While sample X has higher alkali content than the cenospheres sample, it is much lower than the SISCOR sample.

Table 3 (below), illustrates the percentage leached with respect to the major oxides as determined by ICP and the normalized leach rate with respect to time and exposed surface area.

TABLE 3

| Percentage leached Wt. % | Phoenix cement cenosphere | SISCOR | X |
|---|---|---|---|
| $SiO_2$ | 15.6 | 30.7 | 7.9 |
| $Al_2O_3$ | 1.7 | 6.0 | 6.8 |
| $K_2O$ | 18.4 | 62.0 | 33.9 |
| $Fe_2O_3$ | 0.1 | 1.0 | 0.05 |
| $TiO_2$ | 0.4 | 1.8 | 0.2 |
| MgO | 0.03 | .01 | 0.02 |
| $Na_2O$ | 54.7 | 59.5 | 51.6 |
| Total percentage leached wt. % | 11.4 | 29.8 | 8.1 |

From Table 3 above, it is clear that sample X exhibited the least amount of leaching followed by cenospheres and then SISCOR. The leach rate is directly associated with the composition's alkali resistant properties. As a result of the low leaching, particles made according to the composition of sample X should provide better resistance to the caustic environment found in hydrating cement than either of the other two commercially available alkali resistant glasses.

EXAMPLE B

In the following example, additional commercial products were tested, including 3M-S32: SCOTCHLITE®, manufactured by 3M Corp., of Minnesota; PORAVER®, manufactured by Spherical Industrial Solution of Toronto, Canada; SPHERIGLASS®, made by PQ Corp, USA; and SIL-CELL®, made by Silbrico Corp., USA. Table 4 lists the major oxides contained in the Example B products.

TABLE 4

|  | MATERIALS | | | |
|---|---|---|---|---|
|  | 3M-S32 | PORAVER | SPHERIGLASS | SIL-CELL |
| $SiO_2$ | 78.6 | 73.1 | 74.9 | 81.1 |
| $Al_2O_3$ | 0.5 | 3.7 | 0.7 | 11.0 |
| CaO | 13.1 | 9.4 | 9.4 | 0.6 |
| $K_2O$ | 0.1 | 0.8 | 0.1 | 5.2 |
| $Fe_2O_3$ | 0.1 | 0.4 | 0.6 | 1.6 |
| $TiO_2$ | 0.0 | 0.1 | 0.1 | 0.1 |
| MgO | 0.2 | 2.1 | 4 | 0.1 |
| $Na_2O$ | 7.3 | 14.8 | 14.5 | 2.9 |

The leach data for 5 h leach at conditions described previously of the samples listed in Table 4 are presented in the following Table 5:

TABLE 5

|  | MATERIALS | | | |
|---|---|---|---|---|
| Percent of oxides leached out wt. % | 3M-S32 | PORAVER | SPHERIGLASS | SIL-CELL |
| $SiO_2$ | 27.2 | 36.3 | 20.5 | 27.7 |
| $Al_2O_3$ | 4.7 | 2.3 | 13.1 | 1.1 |
| CaO | 4.8 | 0.9 | 0.0 | 10.9 |
| $K_2O$ | 100 | 60.2 | 100 | 12.1 |
| $Fe_2O_3$ | 5.9 | 0.6 | 0.3 | 0.8 |
| $TiO_2$ | 7.7 | 2.0 | 2.4 | 2.6 |
| MgO | 2.2 | 0.1 | 0.02 | 2.8 |
| $Na_2O$ | 51.9 | 73.6 | 42.4 | 50.4 |
| Total Percentage leached at 5 h | 25.9 | 38.1 | 21.8 | 25.4 |

Total percentage leached from sample X: 8.1

From Table 5 above, it can be seen that materials with high silica alone (SIL-CELL), and high silica and calcium oxide (3M-S32) are highly affected by an aqueous alkaline environment as experienced within hydrating cement in an autoclave, thus further supporting the conclusion that CaO alone is unable to provide acceptable alkali resistance. Likewise, both PORAVER and SPHERIGLASS, even though they exhibit modest amounts of CaO, are highly susceptible to corrosion in the aqueous alkaline environment at elevated temperatures, again reinforcing the inventor's beliefs that other elements are needed to cooperate with CaO in order to provide the desired alkali resistance.

EXAMPLE C

Example C testing was carried out to quantify the effects of adding small amounts of zirconia to embodiments of the present invention to determine the improved alkali resistance. In the following examples, samples 1A, 1B, 1C, and 1D were prepared according to embodiments of the present invention. These samples of alkali resistant glass were made from formulations consisting of fly ash, sodium hydroxide, zirconium silicate and sugar. The samples were prepared by mixing the ingredients according to the formulations as shown in Table 6.

TABLE 6

Formulations for the samples

|  | Fly ash (g) | NaOH (flakes) (g) | Sugar (g) | Zirconium silicate (g) | Water (g) |
|---|---|---|---|---|---|
| 1A | 92 | 5 | 3 | 0 | 25 |
| 1B | 90.5 | 5 | 3 | 1.5 | 28 |
| 1C | 89 | 5 | 3 | 3 | 28 |
| 1D | 86 | 5 | 3 | 6 | 27 |

Sample 2A is a sample of commercially available alkali resistant glass having a nominal 0% zirconium oxide content. Sample 2B is a sample of commercially available alkali resistant glass having a nominal 15% zirconium oxide content. Sample 2C is a sample of commercially available alkali resistant glass having a nominal 16% zirconium oxide content. Sample 2D is a sample of commercially available alkali resistant glass having a nominal 17% zirconium oxide content. The compositions are presented in table 6 below.

The samples 1A, 1B, 1C and 1D were each blended into homogeneous slurry, poured into a flat dish and allowed to solidify at room temperature for approximately 5 minutes. The resulting product was further dried at about 50 degrees Celsius for about 20 hours, after which it was ground and sieved to obtain powders within a size range of 106 to 180 μm. In the next step, the powders were fed into a vertical heated tube furnace at approximately 1200-1400° C. at a feed rate of 0.14 g/min. The resulting particles were collected on a funnel shaped collecting device covered with a fine mesh screen positioned at the bottom portion of the furnace. A mild suction was applied to the end of funnel to aid in collecting the particles. The products were each inspected for shape and form using microscopic examination to ensure complete melting, before being assessed for alkali resistance by exposure to Modified Lawrence Solution at 180° C., at a pressure of 135 psi for 5 hours.

The composition and leaching data of each of the samples is shown in Table 7 below.

TABLE 7

Materials composition by wt %

|  | Embodiments of the present invention | | | | Commercially available alkali resistant glasses | | | |
|---|---|---|---|---|---|---|---|---|
| Sample | | | | | | | | |
|  | 1A | 1B | 1C | 1D | 2A | 2B | 2C | 2D |
| $SiO_2$ | 50.7 | 50.6 | 48.5 | 47.1 | 41.3 | 52.9 | 54.8 | 59.2 |
| $Al_2O_3$ | 19.8 | 19.3 | 20.1 | 19.4 | 3.3 | 0.7 | 0.9 | 0.3 |
| $Fe_2O_3$ | 7.5 | 7.5 | 7.2 | 7.7 | 0.1 | 0.3 | 0.2 | 0.1 |
| CaO | 12.4 | 12.1 | 12.1 | 11.7 | 6.0 | 4.85 | 5.7 | 0.6 |
| MgO | 2.5 | 2.2 | 3.2 | 3.0 | 2.3 | 0.4 | 0.1 | 0 |
| $Na_2O$ | 4.6 | 4.6 | 4.4 | 4.5 | 5.5 | 10.7 | 11.7 | 9.0 |
| $K_2O$ | 1.2 | 1.2 | 1.1 | 1.1 | 0.1 | 1.52 | 2.3 | 1.4 |
| $TiO_2$ | 1.3 | 1.3 | 1.2 | 1.2 | 0 | 3.2 | 0.7 | 1.8 |
| $ZrO_2$ | 0 | 1.2 | 2.2 | 4.2 | 0 | 15 | 16 | 17 |
| Total Leaching by wt. % | | | | | | | | |
|  | 8.2 | 9.1 | 7.1 | 6.4 | 15.8 | 4.9 | 5.0 | 2.7 |

It can be seen that samples 1A, 1B, 1C, and 1D, made according to the present invention, all have very comparable leach rates, and the addition of small amounts of zirconia only marginally improve their alkali resistance. In addition, while samples 2B, 2C, and 2D exhibit lower leaching rates, they contain very high amounts of zirconia, and thus are significantly more expensive to produce because of material cost and required melting energy. Sample 2A, a no-ZR commercially available alkali resistant glass, shows poor alkali resistance in comparison with the samples prepared according to the present invention.

While the included examples do not define the full limits of the inventive concepts presented herein, they do indicate some very interesting trends. Based upon hundreds of tests and extensive use of statistical analysis of the test results, it has been found that there are a group of non-zirconia glasses that provide exceptional alkali resistant characteristics that can be manufactured economically from abundant materials. It is believed that these non-zirconia glasses exhibit their alkali resistant characteristics due to the interaction of increased levels of CaO and Fe, while having a relatively low $R_2O$ (where $R_2O$ consists essentially of $K_2O$, $Na_2O$, and $Li_2O$). Specifically, the present inventors believe that alkali resistance in high pH environments can be improved with increasing $CaO/R_2O$ molar ratio, the concentration of Fe, and in some embodiments, the addition of Zr and/or Ti into the glass composition. In some embodiments, the $CaO/R_2O$ molar ratio is greater than 1. In other preferred embodiments, it can be greater than 2 or 3, or more. For example, testing and analyses have determined that glasses having the desired alkali resistant properties can be economically manufactured according to the following composition:

>35% $SiO_2$
1-25% CaO
1-15% $Fe_2O_3$
1-10% $R_2O$, and
an amount of $Al_2O_3$ such that $SiO_2:Al_2O_3>1$.

Optionally, up to about 10 wt. %, or even up to about 15 wt. % $ZrO_2+TiO_2$ can be added to further improve the alkali resistant properties of the described glass. Ternary phase diagrams showing exemplary compositional ranges are presented in FIGS. 1a and 1b which incorporate 0 wt. % and 15 wt. % $ZrO_2+TiO_2$ respectively. Inexpensive glass articles made from the described compositions are particularly suitable in cementitious applications where the cementitious products are cured under high temperature hydrothermal conditions (e.g., above 100° C.), such as is experienced in an autoclave. As discussed above, by forming glasses having the described compositions and processing the glass articles as described, a passivity layer can be formed on the exterior surface of the glass articles, thus further improving their alkali resistance.

While the foregoing description and samples produced according to embodiments of the invention limited the inclusion of $ZrO_2$ and $TiO_2$, it is believed that modest amounts of these elements, such as a combination of up to about 15 wt. %, will serve to further increase the alkali resistant properties of the samples, and therefore, some embodiments of the present invention include up to about 15 wt. %, and more preferably up to about 10 wt. % of either $ZrO_2$, $TiO_2$, or a combination thereof.

While the inventors have ascertained that high temperature hydrothermal treatment results in the formation of a passivity layer on the unique glass articles described herein, the inventors further believe that a passivity layer can be formed under low temperature hydrothermal conditions as well. The passivity layer is believed to be formed by redeposition of leached ingredients from the glass matrix, which is accelerated under high temperature hydrothermal conditions. However, if given sufficient time, an alkali solution at low temperature (e.g., below about 100° C.) is believed to cause similar results. Specifically, tests have been run in an aqueous alkaline solution prepared with 2.343 g/L of LiOH, and 0.080 g/L of Ca (OH)$_2$ at a pH of about 13.0, at temperatures of 35° C. and 95° C. The inventors have discovered that, even at 35° C., a passivity layer begins to form, and given sufficient time, it is believed that a substantially continuous passivity layer will form and cover the surface of the glass article. In fact, testing shows that if left at about 95° C. for a sufficient amount of time, a continuous passivity layer forms over the surface of the glass article.

In addition, the inventors believe that a passivity layer may be formed through other processes, such as by preferential leaching of the glass materials from the surface of the article. Alternatively, reaction of metal hydroxides or dissolved inorganic compounds such as nitrates, chlorides, sulfates, silicates, borates, phosphates, and the like, with the glass constituents may also form a passivity layer on the surface of the glass.

Accordingly, the general methods by which a passivity layer can be formed are either through leaching and redeposition, by glass material being preferentially leached from the surface of the article, or by chemical reaction of the soluble species of the contact solution with the glass.

While the inventors have discovered that a passivity layer can be formed in situ by incorporating the glass articles into a cementitious composite, it was unexpectedly found that a passivity layer can be formed outside of a cementitious composite by treatment in an appropriate solution. Accordingly, manufactured glass articles can be post treated to form a passivity layer. In one preferred embodiment, the post treatment is conducted by subjecting the glass articles to hydrothermal treatment conditions, such as, for example in a pressurized vessel containing an alkaline solution of maintained between 100° C. and 400° C. for a predetermined length of time. The alkaline solution, containing a predetermined amount of Ca(OH)$_2$, may be removed and recycled for treating a new batch of glass articles, while the glass articles themselves may be washed, dried and packaged using conventional techniques for washing, drying and packaging powders.

The inventors have also determined that a passivity layer may also be formed on the glass articles at temperatures lower than 100° C., eliminating the need for a pressurized vessel in the process above. The glass articles with the formed passivity layer can then be incorporated into other applications where durability is a concern. Alternatively, a coating or other type of surface layer can be added to improve the glasses compatibility with the material matrix.

Accordingly, glass articles can be manufactured according to the compositions and methods described herein, subsequently treated to form a passivity layer, and then integrated into a desired application.

The form of glassy articles produced by the described methods and compositions can take many shapes. While fibers and, spheres have been primarily used as examples in the foregoing description, other shapes are possible and are to be considered within the scope of the present disclosure. Other shapes may include, without limitation, micro balloons; solid or hollow spheres; fabric; and continuous, chopped, woven, or blown fibers. The glassy articles may also be foamed glass.

Of particular note, another valuable configuration of the unique glass formulations disclosed herein results in a glass flake. As used herein, unless otherwise noted, a flake is a material that has a breadth and a substantially uniform thickness wherein the breadth is substantially larger than the thickness. In many embodiments, a flake has an irregular outer profile in plan view.

Flakes can be formed, for example, by forming a thin glass sheet and then dividing the sheet into smaller particles. One method of forming a glass sheet is by delivering a molten glass matrix through counter-rotating rollers. In one preferred embodiment, this produces a glass sheet and resultant flakes having a cross-sectional dimension corresponding to the spacing of the rollers, which in some cases, can be on the order of about 1-3 µm.

Another acceptable method is by extruding the molten glass through an appropriately sized die. By either of these methods, the thickness of the glass is determined by the spacing of the rollers or by the geometry of the die. According to these methods of producing glass flakes, the thickness of the flakes can be almost infinitely varied to suit the final use requirements of the flakes. However, most uses for flakes typically require a thickness of less than about 1000 µm. Accordingly, flakes are produced having a thickness of less than about 1000 µm, and in other embodiments, thicknesses of less than about 500 µm, 250 µm, 100 µm, 50 µm, 20 µm, 10 µm, 5 µm, 2 µm, and 1 µm can be produced.

Another method for producing glass flakes is by spraying molten glass into the air. For example, molten glass can be sprayed through an appropriately shaped nozzle which forms the glass spray into a suitable shape and the glass is then quenched or otherwise cooled to conform to the desired shape.

Glass flakes produced according to any suitable methods can be further processed to result in a desired dimension by any crushing technique, such as ball milling for example, or other suitable process designed to reduce glass to a smaller size. In one specific embodiment, flakes are produced having a breadth of between about 10 and 10,000 µm and having a thickness of between about 1 to 10 µm.

Figure 2C:
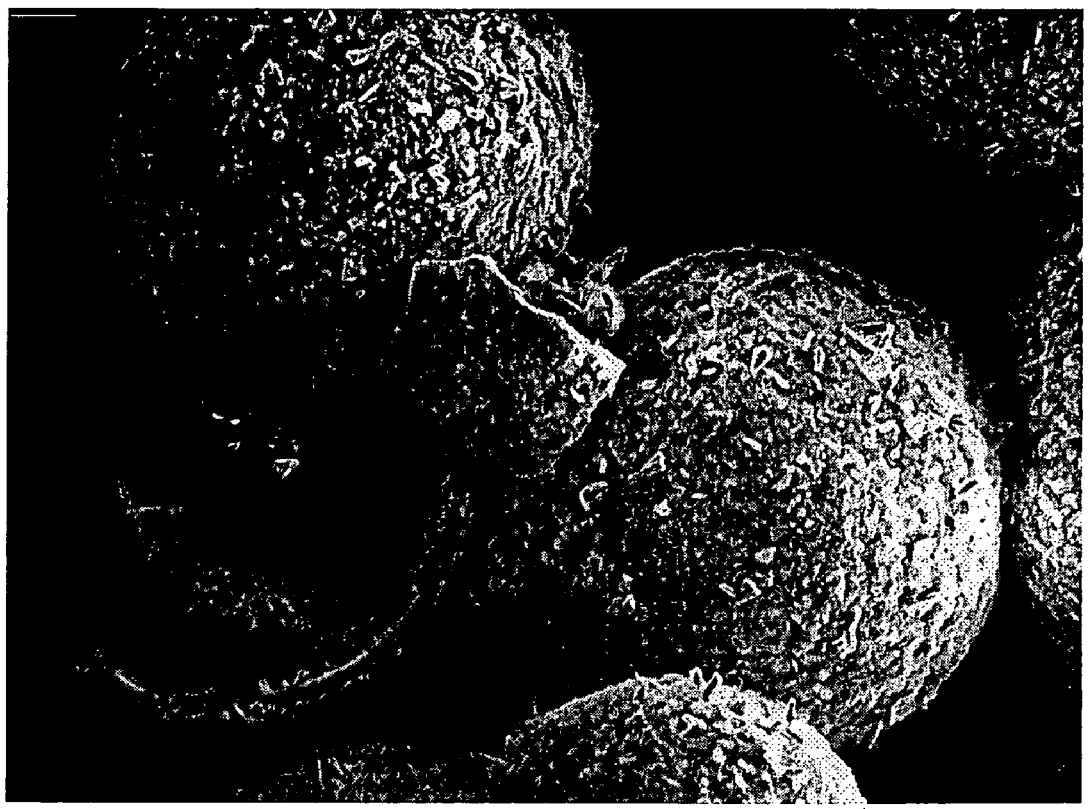

According to another method of producing glass flakes, spheres are produced as described elsewhere herein and the resulting spheres are crushed or otherwise fractured to result in semi-spherical flakes, such as those shown in FIG. 2C. Of course, the semi-spherical flakes will naturally have curvature in one or more directions; notwithstanding, the flakes can be dimensioned such that the flakes exhibit the desired functional or aesthetic characteristics. One approach to simulating a planar flake, such as those produced from a large flat sheet of glass, is to reduce the breadth of the flake to a small size relative to the starting sphere diameter. As the ratio of flake breadth to sphere diameter approaches zero, the flakes approach planar.

In one preferred embodiment, a sphere having a diameter of between about 30 and 1000 µm is fractured to produce flakes having a breadth of between about 5 and 200 µm in size. The thickness of the resulting flakes is dependent upon the wall thickness of the sphere, and in many embodiments, the thickness of the resulting flakes can be on the order of about 0.5 µm to about 10 µm.

Several methods for manufacturing glass flakes are taught in the relevant literature, any of which are suitable for producing the unique materials described herein. However, the unique glass formulations disclosed herein result in unique flakes having highly desirable properties that have been unachievable until now.

In addition to varying shapes, the glass produced by the described methods and compositions herein may also be combined with other minerals, clays, polymers, ceramics, metals or glass to form a composite material or glass alloy.

In one embodiment, an alkali resistant glass formulation is made in the form of fiber. In some preferred embodiments the alkali resistant glass fiber is in the form of continuous strands. In other embodiment, the alkali resistant glass fiber is in the form of chopped fiber. The glass fiber may be made by a rotary process whereby the glass formulation is melted and dropped in a "spinner" having a peripheral wall with a plurality of holes through which the glass is forced by centrifugal force to form fibers. In some preferred embodiments, additives may be added into the disclosed preferred alkali resistant glass formulations to reduce the softening and/or melting temperature of the glass, thus making it easier to form the glass particle or articles in the specified shapes or forms.

In one embodiment, an alkali resistant glass article having the described formulations may be prepared by using one of the methods described in Applicant's copending U.S. patent application having Ser. No. 10/787,894, filed Feb. 25, 2004 entitled "METHODS AND FORMULATIONS FOR PRODUCING LOW DENSITY PRODUCTS," the entirety of which is incorporated herein by reference. In addition, other methods and articles can be employed and produced, such as those disclosed and described in Applicant's copending U.S. patent application having Ser. No. 10/648,184, filed Aug. 25, 2003 and entitled "Synthetic Microspheres and Methods of Making Same," the entirety of which is hereby incorporated by reference. According to several preferred embodiments disclosed herein, the unique glass formulations are used to produce microspheres. The preferred embodiments disclosed herein are preferably produced by a method that produces spheres at a rate far exceeding the capabilities of a heated drop tube. For example, a heated drop tube can be used to produce spheres at a rate on the order of about one gram per hour. In contrast, many of the sphere embodiments and examples disclosed herein are produced in a combustion furnace at a rate that is greater than about 1 kg per hour, which far exceeds the capabilities of a drop tube furnace. In fact, the inventors are able to use the novel glass formulations taught herein to produce alkali resistant spheres at a rate greater than about 0.5 MT/hr (metric tons per hour). In other preferred embodiments, the production rate is 1 MT/hr, 2 MT/hr, 3 MT/hr, or greater.

Moreover, the disclosed glass compositions can be used to form a synthetic aggregate having multiple phases, such as a combination of amorphous and crystalline phases present in the glass structure. These phases can be present in the glass either due to incomplete raw material melting or crystallization upon cooling. The degree of crystallinity can either be controlled by firing conditions or by cooling conditions. Moreover, other phases, such as gas, may be present in the formed glassy material. The result is a synthetic aggregate having a lower density than a fully homogeneous glass article. In one preferred embodiment, a synthetic aggregate is produced by controlling the firing conditions, e.g. firing temperature and residence time within a furnace, to produce a partially vitrified synthetic aggregate containing crystal phase material and/or gas bubbles within the glass material, thus producing a heterogeneous material. Of course, the described heterogeneous glass may be used to form flakes, fibers, spheres, or any other desired configuration.

In some preferred embodiments, the glass particles, aggregates, flakes or fibers made according to the disclosure above is used to improve the mechanical properties of composite materials. In one preferred embodiment, the alkali resistant glass in the form of fibers, flakes, aggregates is used to improve the tensile strength of the composite cementitious or polymeric products. In another preferred embodiment, expanded, foamed or hollow alkali resistant glass particles can be used to impart low density to cementitious and polymeric composites. In other preferred embodiment, the alkali resistant glass particles may also have other beneficial effects, such as reducing moisture movement, thermal movement, improving thermal insulation value, reducing cost or improving workability such as rheology or handleability.

While the foregoing description utilizes several examples, these examples are given to illustrate alternative embodiments of the present invention, and are not to be construed as defining the scope of the invention. For example, while it has been disclosed to use the unique glass formulations in a cementitious composite, it is within the scope of the invention to utilize articles made according to the unique glass formulations in polymers, metals, and other materials that can benefit from the properties of the glass described herein.

We claim:

1. A synthetic microsphere, comprising:
    a synthetic, hollow, substantially spherical silicate-containing glass wall, the wall having an inner surface and an outer surface and a thickness therebetween; and
    a passivity layer on the outer surface of the spherical wall, the passivity layer formed by hydrothermal treatment in a basic environment.

2. The microsphere of claim 1, wherein the passivity layer substantially covers the outer surface of the spherical wall.

3. The microsphere of claim 1, wherein the passivity layer has a thickness less than about 10% of the spherical wall thickness.

4. The microsphere of claim 1, wherein the passivity layer is substantially chemically inert in a basic environment having a pH of about 12-14.

5. The microsphere of claim 1, wherein the passivity layer is formed through crystalline redeposition of leached glass elements.

6. The microsphere of claim 1, wherein the passivity layer is rich in silica and alumina in comparison with the spherical wall.

* * * * *